United States Patent [19]

Kuroda et al.

[11] Patent Number: 4,576,927

[45] Date of Patent: Mar. 18, 1986

[54] POROUS ADSORBENT FOR ADSORBING LOW DENSITY LIPOPROTEINS

[75] Inventors: Toru Kuroda; Naokuni Yamawaki, both of Fuji, Japan

[73] Assignee: Asahi Kasei Kogyo Kabushiki Kaisha, Osaka, Japan

[21] Appl. No.: 668,795

[22] Filed: Nov. 6, 1984

[30] Foreign Application Priority Data

Nov. 25, 1983 [JP] Japan ................................. 58-220532
Jan. 18, 1984 [JP] Japan ................................... 59-5678
May 16, 1984 [JP] Japan .................................. 59-96375
May 17, 1984 [JP] Japan .................................. 59-97501
May 18, 1984 [JP] Japan .................................. 59-98597

[51] Int. Cl.$^4$ ............................................. B01J 20/22
[52] U.S. Cl. ...................................... 502/402; 502/401
[58] Field of Search ................ 502/158, 159, 401, 402

[56] References Cited

U.S. PATENT DOCUMENTS

| | | | |
|---|---|---|---|
| 3,941,718 | 3/1976 | Barabas et al. | 502/402 X |
| 3,984,349 | 10/1976 | Meiller et al. | 502/401 |
| 4,029,583 | 6/1977 | Chang et al. | 502/402 X |

OTHER PUBLICATIONS

Paul J. Lupien et al., Lancet, 2, 1261–1264 (1976).
Lars A. Carlson, Clin. Chim. Acta, 5, 528–538 (1960).

*Primary Examiner*—W. J. Shine
*Attorney, Agent, or Firm*—Birch, Stewart, Kolasch & Birch

[57] ABSTRACT

An adsorbent for adsorbing low density lipoproteins, which comprises a surface and, linked with the surface, at least one member selected from a silanol group and a synthetic polyanion member having a molecular weight of 600 or more, and has pores of diameters widely distributed in a specific range. The adsorbent has a high adsorbing capacity for low density lipoproteins and is useful for purifying and regenerating a body fluid with high selectivity for low density lipoproteins.

15 Claims, 1 Drawing Figure

U.S. Patent    Mar. 18, 1986    4,576,927

POROUS ADSORBENT FOR ADSORBING LOW DENSITY LIPOPROTEINS

This invention relates to an adsorbent for low density lipoproteins. More particularly, this invention is concerned with an adsorbent useful for effectively and selectively adsorbing and removing low density lipoproteins which are believed to have a close relation with various kinds of diseases attributed to the increase of plasma lipid, which adsorbent comprises a surface and, linked with the surface, at least one member selected from a silanol group and a synthetic polyanion member having a molecular weight of 600 or more, and has pores of diameters widely distributed in a specific range.

As is generally known, the increase of lipids in blood, particularly low density lipoproteins, is believed to have a close relation with the cause of atherosclerosis or the progress of atheroscelosis. In the event that atherosclerosis is progressed, the possibility of serious diseases relating to the circulatory system, such as cardiac infarction and cerebral embolism, which lead to a high death rate, becomes very high.

Therefore, it has been desired to suppress the progress of such diseases, to reduce the symptoms of such diseases or to hasten the recovery from such diseases by selectively adsorbing and removing low density lipoproteins in a body fluid such as blood and plasma.

As the techniques employable for adsorbing and removing low density lipoproteins in a body fluid, there is known a method in which an adsorbent prepared by fixing heparin to an agarose gel is used [Lupien, P-J. et al: "A new approach to the management of familial hypercholesterolemia: Removal of plasmacholesterol based on the principle of affinity chromatography", Lancet, vol. 2, pp. 1261-1264 (1976)] and a chromatography method in which glass powder or glass bead is used [Carlson, L. A.: "Chromatographic separation of serum lipoprotein on glass powder columns. Description of the method and some applications" Clin. Chim. Acta, vol. 5, pp. 528-538 (1960)]. The adsorbent prepared by fixing heparin to an agarose gel adsorbs low density lipoproteins selectively but the adsorbing capacity of the adsorbent is insufficient. Further, since in this adsorbent, agarose is used as the carrier, the adsorbent has various drawbacks. For example, the adsorbent is insufficient in mechanical strength so that it is difficult to handle the adsorbent and clogging of the adsorbent is likely to occur during the flowing of a body fluid therethrough. Further, the pores of the adsorbent are likely to collapse during the step of sterilization. On the other hand, the chromatography method in which glass powder or glass bead is used has such drawbacks that not only the adsorbing capacity of glass powder or glass bead is low but also the selective adsorbing ability of glass powder or glass bead is low. Therefore, such method is not practicable.

In view of the problems of the prior art adsorbents or techniques as mentioned above, the present inventors have made extensive and intensive studies with a view to providing an adsorbent which not only can be widely used as an effective clinical means, adsorbs low density lipoproteins selectively in high efficiency and exhibits little non-specific adsorption, but also can be used in safety, can be subjected to a sterilization treatment in a simple manner and is useful for purifying and regenerating a body fluid. As a result, the present inventors have found that a porous adsorbent which comprises a surface and, linked with the surface, at least one member selected from a silanol group and a synthetic polyanion member having a weight average molecular weight of 600 or more and in which the pore diameters are widely distributed in a specific range has a surprisingly high adsorbing capacity for low density lipoproteins. Further, the present inventors have found that when the adsorbent has a low degree of volume shrinkage at a pressure difference of 200 mmHg, it is easy to handle the adsorbent; clogging of the adsorbent is difficult to occur during the flowing of a body fluid therethrough; the adsorbent can be used safely and is useful for purifying and regenerating a body fluid.

Based on the above, the present invention has been completed.

It is, therefore, an object of the present invention to provide an adsorbent which is highly effective in selectively removing low density lipoproteins from a body fluid and is free from the drawbacks of the conventional adsorbents.

The foregoing and other objects, features and advantages of the present invention will be apparent to those skilled in the art from the following detailed description and appended claims taken in connection with accompanying drawing

BRIEF DESCRIPTION OF THE DRAWING

The FIGURE of the application is a cross-sectional view of an absorbing device containing the adsorbent material of the present invention.

DESCRIPTION OF THE INVENTION

According to the present invention, there is provided a porous adsorbent for adsorbing thereonto low density lipoproteins which comprises a surface and, linked with the surface, at least one member selected from a silanol group and a synthetic polyanion member having a molecular weight of 600 or more, and which has pores, the pore diameters of pores occupying 70% or more of pore volume based on the total pore volume of the adsorbent being distributed in the range of 20 nm to 1,250 nm, the pore volume of pores of a pore diameter in the range of 0.8 D to 1.2 D in which D represents the pore diameter of any one of pores having pore diameters in the range of 20 nm to 1,250 nm being less than 80% based on the total pore volume of the adsorbent.

The adsorbent of the present invention is useful for adsorbing low density lipoproteins selectively. In the present invention, the term "low density lipoprotein" is intended to mean a lipoprotein which has a molecular weight of $2.2 \times 10^6$ to $3.5 \times 10^6$, a hydrated density of 1.003 g/ml to 1.034 g/ml, a flotation coefficient (solvent density: 1.063) of 0 to $20 \times 10^{-13}$ cm.sec$^{-1}$.dyn$^{-1}$.g$^{-1}$ and a diameter of 20.0 to 30.0 nm [SCANU, A. M.: plasma lipoproteins: an introduction "The Biochemistry of Atherosclerosis" ed. by SCANU, A. M. pp. 3-8 (1979)]. Lipoproteins having a density lower than that of the above lipoproteins, namely lipoproteins having a flotation coefficient (solvent density: 1.063) larger than $20 \times 10^{-13}$ cm.sec$^{-1}$.dyn$^{-1}$.g$^{-1}$ may be adsorbed. However, it is preferred that lipoproteins having a density larger than that of the above-mentioned low density lipoproteins be not adsorbed.

The term "silanol group" used herein means a functional group represented by $\equiv$Si-OH. The silanol group is usually present on the surfaces of quartz, silica glass and silica gel. Therefore, a porous silica glass, porous silica gel and the like per se can be used as the adsorbent for adsorbing low density lipoproteins provided that their pore diameters and pore diameter distribution satisfy the requirements mentioned later. Where a porous carrier having no silanol group thereon is used to prepare an adsorbent, silanol groups may be introduced to the surface of pores of the carrier by using a silicon compound or coating the surface of the pores of the carrier with a coating material having silanol groups. In this case also, the resulting adsorbent should satisfy the later-mentioned requirements with respect to pore diameter and pore diameter distribution. Since silanol groups produce a strong negative charge in a body fluid, the silanol groups can be bonded to low density lipoproteins by a strong coulomb force.

Where the carrier per se contains a silanol group, the terminology "carrier" as used herein means a substrate portion of the carrier which does not contain the silanol group. In the present invention, silanol groups may be bonded to the carrier directly or indirectly.

The silanol group density of the adsorbent of the present invention is preferably 0.8 to 7.5 $\mu$mol/m$^2$ in the case where silanol groups are contained in the adsorbent. When the silanol group density is less than 0.8 $\mu$mol/m$^2$, the adsorbing capacity for low density lipoproteins is decreased. On the other hand, when the silanol group density is more than 7.5 $\mu$mol/m$^2$, non-specific adsorption, namely the adsorption of immunoglobulin, complements, fibrinogen and the like is disadvantageously promoted to activate coagulation fibrinolysis system and complement system. The silanol group density of the adsorbent of the present invention is more preferably 2.0 to 7.2 $\mu$mol/m$^2$, most preferably 3.0 to 7.0 $\mu$mol/m$^2$.

When, as the carrier of an adsorbent, a porous glass of which the silanol group density is fixed is used to prepare an adsorbent having a silanol group density in the above range, the silanol group density may be adjusted by using a silane coupling agent such as 3-glycidoxypropyltrimethoxysilane, 3-aminopropyltriethoxysilane.

The silanol group density of the adsorbent can be determined by various ordinary methods, particularly by infrared spectrophotometry.

The term "synthetic polyanion member" used herein is intended to mean a synthetic polyanion group which has a weight average molecular weight of 600 or more and which has a plurality of functional groups capable of producing a negative charge in a body fluid, such as a carboxyl group (COOH, COO$^-$) and a sulfonic group (SO$_3$H, SO$_3^-$). The weight average molecular weight of the synthetic polyanion member is preferably 600 to $10^7$.

As the synthetic polyanion member, there may be mentioned vinyl type synthetic polyanions such as polyacrylic acid, polymethacrylic acid, polyvinyl sulfonic acid polymaleic acid, polyfumaric acid and derivatives thereof and the like; styrene type synthetic polyanions such as poly(sytrenesulfonic acid), poly(styrenephosphoric acid) and the like; peptide type synthetic polyanions such as polyglutamic acid, polyaspartic acid and the like; nucleic acid type polyanions such as poly U, poly A and the like; and synthetic polyanions such as polymethacrylic acid, polyphosphoric acid, polyphosphate ester, poly -$\alpha$-methylstyrenesulfonic acid, copolymers of styrene and maleic acid and the like.

Polyanions obtained by synthesis as mentioned above are advantageous as compared with natural polyanions. Illustratively stated, synthetic polyanions are excellent in chemical stability and it is easy to prepare synthetic polyanions which are stable to high-pressure steam sterilization, gamma rays sterilization, ethylene oxide gas sterilization and the like. Further, the molecular weight of synthetic polyanions can be controlled relatively with ease. Still further, synthetic polyanions which hardly cause activation of complement which activation is observed in the case of natural polyanions such as polysaccharides can be easily prepared. Of the synthetic polyanions, vinyl type synthetic polyanions are preferable because they can be directly bonded to a carrier by graft polymerization, which enables the carrier to have polyanions in a large amount.

Low density lipoproteins to be adsorbed are large lipoproteins which have a diameter as large as about 20 nm. Therefore, it is preferred that the synthetic polyanion member have a chain structure and have a long chain. The synthetic polyanion member has preferably at least one negative charge-producing functional group per 300 in weight average molecular weight of the synthetic polynaion member, more preferably one or more negative charge-producing functional groups per 200 in weight average molecular weight of the synthetic polyanion member, most preferably one negative charge-producing functional group per 50 to 150 in weight average molecular weight of the synthetic polyanion member. The "molecular weight of the synthetic polyanion member" means that including the molecular weight of the negative charge-producing functional group or groups. When the molecular weight of the synthetic polyanion member is small, low density lipoproteins are difficult to be adsorbed. Therefore, in the present invention, the weight average molecular weight of the synthetic polyanion member is 600 or more, preferably 2,000 or more, more preferably 4,000 to $10^6$, most preferably 5,000 to $10^5$.

The function of the synthetic polyanion member is believed to be as follows. A plurality of functional groups of the synthetic polyanion member having a negative charge in a body fluid recognize a plurality of sites of low density lipoproteins. Thus, low density lipoproteins are bonded to the synthetic polyanion member by means of a strong coulomb force so that low density lipoproteins are adsorbed onto the adsorbent.

Among negative charge-producing functional groups, a carboxyl group (COOH, COO$^-$) which gives especially favorable results is preferred. A carboxyl group is weakly acidic as compared with a sulfonic acid group (SO$_3$H, SO$_3^-$) and, advantageously, an adsorbent having carboxyl groups exhibits little adsorption for useful proteins such as albumin. Further, such adsorbent has a small adsorbing capacity for blood coagulation system proteins and hardly causes activation of such proteins. Still further, such adsorbent hardly adsorbs complement system proteins.

Among the aforementioned synthetic polyanion members, polycarboxylic acids such as polyacrylic acid and polymethacrylic acid are especially stable and, therefore, preferred.

The amount of the negative charge relative to that of the adsorbent is generally 1 $\mu$eq ($10^{-6}$ equivalent) per ml of the adsorbent to 1 meq ($10^{-3}$ equivalent) per ml of the adsorbent from the viewpoints of high adsorbing capacity for low density lipoproteins, selective adsorption and slight influence on coagulation fibrinolysis system and complement system. When the amount of the negative charge relative to that of the adsorbent is less than 1 μeq/ml, the adsorbing capacity of the adsorbent is not sufficient for practical use. On the other hand, when the amount of the negative charge relative to that of the adsorbent is more than 1 meq/ml, non-specific adsorption is promoted, which adversely affects the coagulation fibrinolysis system and complement system. The amount of the negative charge relative to that of the adsorbent is preferably 5 μeq/ml to 700 μeq/ml, more preferably 10 μeq/ml to 500 μeq/ml, most preferably 20 μeq/ml to 300 μeq/ml.

The terminology "the amount of the negative charge relative to that of the adsorbent" used herein is intended to mean the amount of the negative charge relative to that of the adsorbent in the wet state. The terminology "adsorbent in the wet state" means an adsorbent obtained by immersing an adsorbent in a physiological saline (a 0.9 wt % aqueous NaCl solution) at 20° C. until the adsorbent comes to equiliblium with the solution (until the adsorbent is sufficiently swollen). In the case where the adsorbent is in a spherical or granular form, the amount of the negative charge relative to that of the adsorbent is determined under such a condition that the ratio of the maximum diameter of the adsorbent particle to the minimum diameter of the adsorbent particle is less than 2.

The amount of the negative charge relative to that of the adsorbent may be determined according to the ordinary method for determining the ion exchange capacity of cation exchange resin [see Wilson & Wilson's, Comprehensive Analytical Chemistry, Vol. XIV, P. 98, Elsevier Science publishing Company, New York (1982)].

As the method for producing the adsorbent of the present invention, there may be mentioned a method in which a carrier is activated and a synthetic polyanion having a weight average molecular weight of 600 or more is linked with the carrier by a covalent bond; a method in which an anion monomer is graft copolymerized to a carrier to form graft chains of polyanion; and the like.

The above-mentioned adsorbent having synthetic polyanion members having a weight average molecular weight of 600 or more should satisfy the later-mentioned requirements with respect to the pore diameter and pore diameter distribution.

The present adsorbent for adsorbing low density lipoproteins may contain on the surface thereof both a silanol group and a synthetic polyanion member. Such adsorbent can be prepared, for example, by activating a carrier having silanol groups such as a porous glass, a porous silica gel or the like using a silane coupling agent and by fixing a synthetic polyanion having a weight average molecular weight of 600 or more to the carrier. Such adsorbent should also satisfy the later-mentioned requirements with respect to the pore diameter and pore diameter distribution.

The total pore volume and pore diameter of the adsorbent of the present invention are determined by calculation with reference to the mercury penetration curve obtained according to the mercury penetration method (see, for example, pages 69 to 73 of Catalyst Engineering Course - 4, Catalyst Measuring Methods, edited by the Japanese Catalyst Society and published by Chijin Shokan, Tokyo, Japan). The pore diameter distribution of the adsorbent can be determined according to the mercury penetration method. In the mercury penetration method, the adsorbent must be in the dry state to obtain the mercuty penetration curve. Hence, with respect to the adsorbent which shrinks in the dry state, a correction must be effected for the shrinkage that has occurred by the drying in order to obtain the values of pore volume, pore surface area and pore diameter of the adsorbent in the wet state (the terminology "adsorbent in the wet state" has the same meaning as mentioned before). For example, in the case where the volume of the adsorbent has been reduced to $1/x^3$ the original volume by the drying, assuming that the surface area and diameter of each pore of the adsorbent have shrinked to, respectively, $1/x^2$ the area before the drying and $1/x$ the diameter before the drying, the pore volume, pore surface area and pore diameter of the adsorbent are multiplied by $x^3$, $x^2$ and $x$, respectively, for the purpose of correction due to the drying of the adsorbent.

The total pore volume of the adsorbent of the present invention may be generally at least 0.5 cc/g, preferably at least 1.0 cc/g, more preferably at least 2.0 cc/g, still more preferably at least 3.0 cc/g. As a general trend, with the increase of the total pore volume, the internal void volume per unit volume of the adsorbent increases so that the adsorbing capacity of the adsorbent for low density lipoproteins becomes large, although the effect of the kind of material of the adsorbent on the adsorbing capacity may be significant. However, it may be preferred that the total pore volume of the adsorbent be less than 70 cc/g, since an adsorbent having a total pore volume of 70 cc/g or more may be too soft to handle with ease.

With respect to the pore diameter distribution, it is preferred that 70% or more of the total pore volume of the adsorbent of the present invention be composed of pores having a pore diameter of from 20 nm to 1,250 nm. That is, it is preferred that the adsorbent of the present invention have a broad distribution of pore diameters which are larger than the diameter of low density lipoproteins.

Moreover, with respect to the distribution of pore diameter of the adsorbent of the present invention, it is required that, at any arbitrary pore diameter D (any of the pore diameters in the range of from 20 nm to 1,250 nm), the volume of pores having a diameter of from 0.8 D to 1.2 D be less than 80% of the total pore volume. That is, it is preferred that the pore diameters be not centralized only in a specific diameter range but be distributed over a broad diameter range.

For the purpose of increasing the surface area available for adsorbing low density lipoproteins from blood and other body fluids, it might be desirable that the pore diameters be centralized in a specific diameter range of from 20 nm to 30 nm. However, an adsorbent having such a narrow pore diameter distribution tends to be clogged, on the granule surface thereof, by very low density lipoproteins, chylomicrons having a diameter of 75 to 1,000 nm and other coexistent matters. The above-mentioned "very low density lipoproteins" are lipoproteins having a diameter of 30 to 80 nm, which is larger than that of low density lipoproteins to be treated with the adsorbent of the present invention. Once clogging of an adsorbent occurs, the low density lipoprotein can no longer enter the interior of the adsorbent granules, thereby causing the adsorbent to have a decreased adsorbing capacity for low density lipoproteins. For the purpose of preventing the clogging of the granule surface of the adsorbent, it is conceivable to use an adsorbent having a large pore diameter. In this case, however, the surface area of the adsorbent disadvantageously decreases, thereby also causing the adsorbent to have a decreased adsorbing capacity for low density lipoproteins.

As stated above, an adsorbent having a narrow pore diameter distribution is subject to the influence of the coexistent matters in blood and other body fluids, and hence it is very difficult to improve the adsorbing capacity of the adsorbent. By contrast, with respect to the adsorbent of the present invention having a broad pore diameter distribution, very low density lipoproteins having a diameter larger than that of low density lipoproteins, chylomicrons and the like are captured by the pores having a relatively large diameter. Hence, their clogging of the pores for passage of low density lipoproteins is well prevented, and as a result, a remarkable improvement of adsorbing capacity can be attained with respect to the adsorbent of the present invention.

In the present invention, the volume of pores having a diameter of from 0.8 D to 1.2 D, at any arbitrary pore diameter D, is generally 75% or less, preferably 70% or less, more preferably 65% or less, based on the total pore volume of the adsorbent.

The surface area of the pores having a diameter of 25 nm or more as used herein indicates an integral value, over the pore diameters from 25 nm to infinity, of a surface area defined as a value which can be calculated from the penetration curve according to the mercury penetration method, on the assumption that each of the pores is in a uniform cylindrical form and that the pores do not intersect infinitely, using the formula:

$$S_{a-b} = \frac{2 V_{a-b}}{r_{a-b}}$$

in which
$S_{a-b}$: surface area of the pores having a diameter not smaller than a but not greater than b
$V_{a-b}$: volume of the pores having a diameter not smaller than a but not greater than b; and
$r_{a-b}$: average diameter of the pores having a diameter not smaller than a but not greater than b That is, the surface area (S) of the pores having a diameter of 25 nm or more is defined as:

$$S = \int_{12.5}^{\infty} 2/r \cdot D(r) \, dr$$

in which
D(r): pore distribution function; and
r: pore radius.

If the value obtained as per the above formula is small, the surface area for adsorption becomes so small that the adsorbing capacity of the adsorbent for low density lipoproteins becomes disadvantageously low.

In the present invention, the pores having a diameter of 25 nm or more have a surface area of generally 10 m² or more, preferably 15 m² or more, more preferably 20 m² or more relative to 1 ml of the adsorbent. However, the surface area should not exceed about 100 m²/ml from the viewpoints of the wall thickness and packing ratio of the adsorbent granules.

It is believed that due to the synergistic effect of the above-described broad pore diameter distribution and large surface area of the pores having a diameter of 25 nm or more, the adsorbing capacity of the silanol group and/or synthetic polyanion member for low density lipoproteins is maximized thereby to enabling the adsorbent to exhibit a high adsorbing capacity for low density lipoprotein.

Since the adsorbent of the present invention is mainly utilized for the treatment, especially purification, of the body fluid, it is required that the adsorbent be not clogged at the time of passage of a body fluid. Accordingly, it is desirable that the adsorbent and therefore the carrier to be employed in the present invention be rigid ones, especially those composed of a synthetic polymer or an inorganic material.

By the terminology "rigid" as used herein it is meant that physical properties are retained over certain levels under an external force applied. In particular, it is preferred that the adsorbent according to the present invention exhibit a degree of volume shrinkage of 15% or less as measured according to a method in which first the adsorbent is packed in a column having an inside diameter of 10 mm and a height of 50 mm, second water is passed through the packed column while maintaining the pressure difference between the column inlet and the column outlet at 200 mm Hg, third the volume shrinkage brought about by the pressure difference is measured, and fourth the degree of shrinkage is calculated from the volume shrinkage and the original volume. The degree of volume shrinkage as measured according to this method is hereinafter often referred to as "degree of volume shrinkage at a pressure difference of 200 mmHg". The degree of volume shrinkage of the adsorbent according to the present invention is preferably 10% or less, more preferably 5% or less, still more preferably 3% or less.

Now, preferred modes of processes for the preparation of the adsorbent of the present invention will be described. The process for the preparation of the adsorbent of the present invention is by no means limited to the processes described below.

For example, the adsorbent of the present invention may be prepared by a process in which a carrier is activated, followed by bonding with a covalent bond at least one member selected from a compound having a silanol group and a synthetic polyanion member having a molecular weight of 600 or more to the activated carrier. Also, the adsorbent of the present invention may be prepared by a process in which a graft polymerization of an anion monomer is effected in the presence of a carrier thereby to form polyanion graft chains over the carrier.

The carrier to be employed in the present invention may be composed of any kind of material, provided that it is suitable for bonding thereto at least one member selected from a compound having a silanol group and a synthetic polyanion member having a weight average molecular weight of 600 or more. As the suitable carrier, there may be mentioned, for example, cellulose gels, dextran gels, agarose gels, polyacrylamide gels, porous glass, vinyl polymer gels and other organic or inorganic porous materials which are customarily employed as the carrier for affinity chromatography. It is requisite, however, that the adsorbent comprising the carrier satisfy the above-described conditions of pore diameter, and pore diameter distribution.

The pore diameter and pore diameter distribution of the adsorbent may be regulated by changing various conditions of production of the gel type carrier such as revolution rate in the step of granulation, the amount of solvent and degree of crosslinking.

Of the above-mentioned carriers, the carriers of a crosslinked copolymer comprising as the major constituent units vinyl alcohol monomer units are preferred. The reasons are as follows. First, with respect to the treatment of plasma, such carriers cause little interaction with proteins and other solutes of the plasma due to their hydrophilic properties, thereby minimizing the non-specific adsorption of the plasma components. Second, such carriers are advantageous since they do not interact with the complement and coagulation systems of the plasma. Third, such carriers exhibit a desirable pore diameter distribution, and have excellent heat-resisting properties thereby to enabling the adsorbent to undergo thermal sterilization. Fourth, such carriers have excellent physical and mechanical strengths which are attributable to the specific structure of the synthetic polymer. Moreover, with respect to the treatment of whole blood, such carriers cause little interaction with the hematocyte components of the whole blood. Hence, such carriers are advantageous in that they minimize the formation of thrombus, non-specific adsorption of hematocyte components and residue of the blood.

The crosslinked copolymer comprising as the major constituent units vinyl alcohol monomer units may be prepared by polymerizing a monomer having a hydroxyl group or by effecting a chemical reaction to cause a polymer to have a hydroxyl group. Such polymerization and chemical reaction may be utilized in combination to prepare the above crosslinked copolymer. For such polymerization, the customary radical polymerization method may be employed. The crosslinking units may be incorporated by effecting a copolymerization using a crosslinkable monomer or by effecting a chemical reaction with a polymer (between polymers or between a polymer and a crosslinkable monomer). Such copolymerization and chemical reaction may be utilized in combination to incorporate the crosslinking units.

For example, the crosslinked copolymer comprising, as the major constituent units, vinyl alcohol monomer units may be prepared by copolymerizing a vinyl monomer with a vinyl or allyl crosslinkable monomer. As the suitable vinyl monomer, there may be mentioned, for example, vinyl carboxylate esters such as vinyl acetate and vinyl propionate, and vinyl ethers such as methyl vinyl ether and ethyl vinyl ether. As the suitable crosslinkable monomer, there may be mentioned, for example, allyl compounds such as triallyl isocyanurate and triallyl cyanurate; di(meth)acrylates such as ethylene glycol dimethacrylate and diethylene glycol dimethacrylate; polyvinyl ethers such as butanediol divinyl ether, diethylene glycol divinyl ether and tetravinyl glyoxal; polyallyl ethers such as diallylidene pentaerythritol and tetraallyloxyethane; and glycidyl acrylates such as glycidyl methacrylate. In copolymerization of the vinyl monomer and crosslinkable monomer, another comonomer may be introduced according to need.

Of the vinyl copolymers, a polyvinyl alcohol crosslinked with triallyl isocyanurate, which may be prepared by a process in which a vinyl carboxylate monomer and a vinyl monomer (allyl compound) having an isocyanurate ring are copolymerized to form a copolymer and the copolymer is saponified, gives a carrier that is excellent in mechanical strength and chemical stability.

Of the above-cited various kinds of carriers, the porous glass carrier is preferred since, for the material, the control of pore diameter and pore diameter distribution is easy. That is, the pore diameter of the glass carrier can be controlled by regulating the phase-separation temperature and time of the glass material. The pore diameter distribution of the glass carrier can be readily controlled by the post-treatment using an alkaline solution. Moreover, the porous glass carrier is preferred because the degree of volume shrinkage of the carrier at a pressure difference of 200 mm Hg is about zero.

In the present invention, a synthetic polyanion member having a molecular weight of at least 600, a compound having a silanol group or the both may be linked with the surface of an insoluble carrier by any of the known means such as covalent bonding, ionic bonding, physical adsorption, embedding, insolubilizing precipitation onto the carrier surface, and the like. From the viewpoint of preventing the dissolution-out of compounds linked with the surface, it is preferred that their fixation and insolubilization be effected by covalent bonding. For this purpose, the customary techniques for activating a carrier and bonding thereto a ligand that have been generally used for fixation of enzymes and affinity chromatography may be employed in the present invention. Moreover, the known graft polymerization techniques in which a polyanion member is grafted to the carrier or activated carrier may be employed to obtain the adsorbent of the present invention.

As the suitable carrier activation method to be employed in the present invention, there may be mentioned, for example, a cyanogen halide method, epichlorohydrin method, bisepoxide method, triazine halide method, bromoacetyl bromide method, ethyl chloroformate method and 1, 1'- carbonyldiimidazole method. The carrier activation method to be employed in the present invention is not limited to the above, if it provides on the carrier a reaction site which can effect a substitution reaction and/or addition reaction with an active hydrogen-containing nucleophilic group such as amino group, hydroxyl group, carboxyl group and thiol group contained in a compound having a silanol group and a synthetic polyanion member. From the viewpoints of chemical stability and thermal stability, however, a method using an epoxide, especially epichlorohydrin, is preferred.

To activate the silica or glass carriers having a silanol group, various kinds of silane coupling agents may be preferably employed, which are, for example, gamma-glycidoxypropyltrimethoxysilane, gamma-aminopropyltriethoxysilane, gamma-mercaptopropyltrimethoxysilane, and vinyltrichlorosilane.

As the suitable graft polymerization method for obtaining the adsorbent of the present invention, there may be mentioned, for example, a method in which a chain transfer reaction is utilized; a method in which a dehydrogenation or dehalogenation reaction under radiation or ultraviolet rays are utilized; and a method in which formation of a peroxide is utilized. Especially, a graft polymerization method in which a anion monomer is graft polymerized to the reducible group such as hydroxyl group, thiol group, aldehyde group and amine group of a carrier in the presence of an initiator such as cerium and iron salts is preferred from the viewpoint of facile handling. It is to be noted that a graft polymerization method may be advantageous because the method permits linking of a synthetic polyanion member having relatively large molecular weight at the deep interior of the carrier.

Two or more kinds of compounds having a silanol group and/or synthetic polyanion members may be linked with the carrier in the present invention.

There have been described above preferable modes of the process for preparing the adsorbent of the present invention in which a compound having a silanol group, a synthetic polyanion member having a molecular weight of 600 or more or the both are linked with a carrier. However, the process for preparing the adsorbent of the present invention is not limited to the above modes. For example, there may be adopted a method in which a compound having a silanol group, a synthetic polyanion member having a weight average molecular weight of at least 600 or the both are bonded with a polymerizable monomer and subsequently the monomer is subjected to homopolymerization or copolymerization or another method in which a compound having a silanol group, a synthetic polyanion member having a weight average molecular weight of at least 600 or the both are activated and subsequently the activated compound, the activated member or the both are linked with the carrier.

In summing up, the unexpected advantages of the present invention can be attained by the specific adsorbent comprising a surface and, linked with the surface, at least one member selected from a silanol group and a synthetic polyanion member having a weight average molecular weight of 600 or more and having a specific pore diameter distribution. The process for preparing the adsorbent is not critical, and the adsorbent may be prepared by various methods as described above.

The form of the adsorbent is not particularly critical, and any of known forms may be used. For example, there may be used spherical, granular, rodlike, fibrous, hollow fibrous and filmy forms. Among these forms, granular and spherical forms are preferred. In the case of granular and special adsorbents, it is preferred that the average particle size thereof be in the range of 25 to 2,500 μm. It is more preferred that the average particle size thereof be 30 to 1,000 μm, especially 35 to 350 μm.

The adsorbent of the present invention can be used in such a manner that the adsorbent is packed and held in a vessel having a body fluid inlet and a body fluid outlet.

Figure 1:
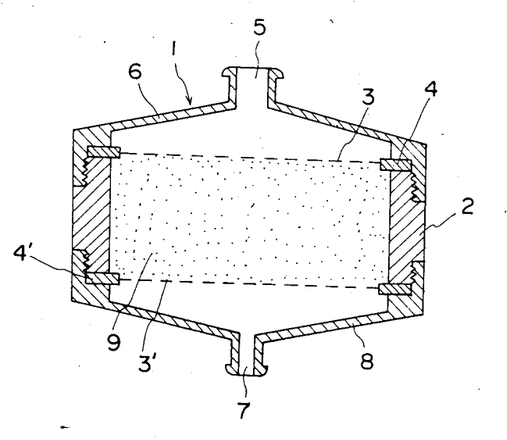

Turning now to the drawing, there is shown one form of a device (numeral 1) containing the adsorbent for adsorbing thereonto low density lipoproteins according to the present invention. In this device, a cap 6 having a body fluid inlet 5 is screwed over one open end of a cylinder 2 through a packing 4 having a filter 3 spread on the inner side therof and a cap 8 having a body fluid outlet 7 is screwed over the other open end of the cylinder 2 through a packing 4' having a filter 3' spread on the inner side thereof, and the adsorbent is packed and held between the filters 3 and 3' form an adsorbent layer 9.

In the adsorbent layer 9, the adsorbent of the present invention alone may be contained, or, the layer 9 may be comprised of an adsorbent mixed with at least one other kind of adsorbent or the layer 9 may be comprised of at least one layer of the adsorbent of the present invention superimposed upon at least one other kind of adsorbent layer. As such other kinds of adsorbents, there can be used active charcoal exhibiting an adsorbing capacity for a wide variety of bio-substances and the like. With such adsorbents, the clinical effects over a broad range can be expected, because of the synergistic actions of the adsorbents. When the adsorbing device is used for extracorporeal circulation, it is preferred that the volume of the adsorbent layer 9 be about 50 to about 400 ml.

When the adsorbing device of the present invention is used for extracorporeal circulation, the following two methods are ordinarily adopted. According to one method, the blood taken out from the interior of the living body is separated into the plasma component and the hematocyte component by means of a centrifugal separator or membrane type plasma separator; the plasma component is passed through the adsorbing device for purification; and the purified plasma component is combined with the hematocyte component and returned to the interior of the living body. According to the other method, the blood taken out from the interior of the living body is directly passed through the aforementioned adsorbing device so that the blood is purified.

The adsorbing capacity of the adsorbent of the present invention is so high that the grain size of the adsorbent can be increased, and that the packing ratio can be decreased. Hence, the body fluid such as blood and plasma can be passed through the adsorbent at a high rate, regardless of the shape of the adsorbent. For this reason, by the use of the adsorbent of the present invention, it is possible to purify a large amount of body fluid in a short time.

The body fluid may be circulated in a continuous manner or discontinuous manner according to clinical necessity or equipment conditions.

As is apparent from the foregoing, the adsorbent of the present invention is capable of effectively adsorbing and removing low density lipoproteins from a body fluid in a highly selective and highly efficient manner. Therefore, by the use of the adsorbent of the present invention, it is possible to build up a very compact adsorbing device for low density lipoproteins which can be used easily and safely.

The adsorbent of the present invention exhibits a remarkably high adsorbing capacity for low density lipoproteins, because clogging of the adsorbent by very low density lipoproteins, chylomicrons and other coexistent matters has been prevented due to the peculiar pore characteristics of the adsorbent that the adsorbent has a broad pore diameter distribution within a specific pore diameter range and that a large portion of the entire surface area of the adsorbent is constituted by the surface areas given by pores having a diameter in a specific range. Moreover, the adsorbent of the present invention can adsorb low density lipoproteins with high selectivity. Further, the adsorbent of the present invention is extremely useful for purifying and regenerating a body fluid such as blood and plasma from hyperlipidemia. It is especially useful as a safe and effective therapy of diseases attributed to hyperlipidemia.

The present invention will now be described in detail with reference to the following Examples, which are illustrative of preferred embodiments of the present invention. It should be understood that these examples are not intended to limit the invention and that obvious changes may be made by those skilled in the art without changing the essential characteristics and the basic concept of the invention.

EXAMPLE 1

20 ml of CPG 500 (a porous glass, having an average pore diameter of 49.3 nm, which is manufactured and sold by Electro Nucleonics, Inc., U.S.A.) was put into 40 ml of 1N aqueous sodium hydroxide. The mixture was shaken at room temperature for 12 hours to effect the dissolution treatment of the porous glass for the adjustment of pore diameter distribution of the pore glass. The above-treated porous glass was thoroughly washed with water and dried. 5 ml of the porous glass was washed with acetone and then put into 22 ml of 20% by volume γ-glycidoxypropyltrimethoxysilane in acetone. The resulting mixture was shaken at 50° C. for 40 hours to obtain an activated porous glass. The activated porous glass was successively washed with acetone, water and 0.1M sodium carbonate buffer (pH 9.8). To the washed porous glass was added 10 ml of 0.1M sodium carbonate buffer containing 100 mg of polyacrylic acid (weight average molecular weight: about 14,000) having at its one end an amino group. The resulting mixture was allowed to react, while stirring, at 50° C. for 3 days for fixation of the polyacrylic acid to the porous glass. After completion of the reaction, the obtained product was thoroughly washed with water to obtain an adsorbent for low density lipoproteins (hereinafter referred to as "LDL"). Incidentally the above-used polyacrylic acid having at its one end an amino group was prepared by oligomerization of acrylic acid using 2-aminoethanethiol as chain transfer agent and α,α'-azobisisobutyronitrile as initiator [M. Okano et al, "Synthesis of 2-hydroxyethyl methacrylate-styrene ABA type block copolymer and structure and wettability of the copolymer," Nippon Kagaku Kaishi, (1), 88–92 (1977)].

The amount of the polyacrylic acid fixed to the porous glass was 5 mg/ml.

The degree of the volume shrinkage of the above-obtained adsorbent was zero at a pressure difference of 200 mmHg. The pore characteristics of the adsorbent were as follows.

Total pore volume: 3.75 cc/g

Pore volume of pores having pore diameters in the range of 20 nm to 1,250 nm based on the total pore volume of the adsorbent (hereinafter referred to as "percentage pore volume of 20–1,250 nm pores"): 91%

Maximum pore volume of the pore volume of pores of a pore diameter in the range of 0.8 D to 1.2 D in which D represents the pore diameter of any one of pores having pore diameters in the range of 20 nm to 1,250 nm based on the total pore volume of the adsorbent (hereinafter referred to as "percentage maximum pore volume of 0.8 D–1.2 D pores"): 31%

Specific surface area of the pores having a diameter of 25 nm or more: 24 m²/ml

The above-mentioned pore diameter distribution and pore volume were measured using a mercury penetration porosimeter manufactured and sold by CARLO ERBA, Italy.

The adsorbent had silanol groups which had not been blocked by the γ-glycidoxypropyltrimethoxysilane treatment.

Adsorption test with respect to the above-obtained adsorbent was effected as follows. Plasma of a patient suffering from familial cholesteremia was mixed with the above-obtained adsorbent in an amount of 12 ml per ml of the adsorbent and incubated, while shaking, at 37° C. for 3 hours. Then, the resulting supernatant was subjected to determination with respect to LDL, cholesterol in high density lipoproteins (hereinafter referred to as "HDL-C"), albumin, and fibrinogen. LDL in the supernatant was determined by nephelometry (Scholnick, H. R., Burstein, M & Eder, H. A.: A simple method for the detection and identification of various types of hyperlipoproteinemia, Protides Biol. Fluids, 19: 289, 1972); HDL-C by the heparin-manganese precipitation method [Burstein, M. et al.: J. Lipid Res., 11, 583 (1970)]; albumin by the bromocresol green method [Doumas et al: Clin. Chim. Acta, 31, 87 (1971)]; and fibrinogen by the single radial immunodiffusion method ["Rinsho Kensa Ho Teiyo (Handbook for clinical examinations)" published by Kanehara Shuppan, Japan].

The test results obtained are shown in Table 1.

TABLE 1

|  | Plasma before adsorption treatment (A) | Plasma after adsorption treatment (B) | Remaining rate* |
|---|---|---|---|
| LDL | 620 mg/dl | 120 mg/dl | 19% |
| HDL-C | 18 mg/dl | 17 mg/dl | 94% |
| Albumin | 3.3 g/dl | 3.2 g/dl | 97% |
| Fibrinogen | 190 mg/dl | 170 mg/dl | 89% |

Note:
*Remaining rate (%) = $\frac{B}{A} \times 100$

As can be seen from Table 1, the adsorbent of the present invention as prepared above exhibited a highly selective LDL adsorption.

COMPARATIVE EXAMPLE 1

Substantially the same procedures as in Example 1 were repeated to prepare an adsorbent, except that the dissolution treatment of CPG 500 with 1N sodium hydroxide was omitted. Thus, there was obtained an adsorbent containing 4.7 mg/ml of the polyacrylic acid bonded thereto. The degree of volume shrinkage of the above-prepared adsorbent was zero at a pressure difference of 200 mmHg. The pore characteristics of the adsorbent were as follows.

Total pore volume: 0.99 cc/g

Percentage pore volume of 20–1,250 nm pores: 98%

Percentage maximum pore volume of 0.8 D–1.2 D pores: 94%

Specific surface area of the pores having a diameter of 25 nm or more: 30 m²/ml

As can be seen from the above data, the pore diameter distribution of the above-prepared adsorbent was very sharp.

The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 2.

TABLE 2

|  | Plasma before adsorption treatment | Plasma after adsorption treatment | Remaining rate |
|---|---|---|---|
| LDL | 620 mg/dl | 380 mg/dl | 61% |
| HDL-C | 18 mg/dl | 17 mg/dl | 94% |
| Albumin | 3.3 g/dl | 3.1 g/dl | 94% |
| Fibrinogen | 190 mg/dl | 180 mg/dl | 95% |

As can be seen from Table 2, the above-prepared adsorbent exhibited no significant adsorption of HDL-C, albumin and fibrinogen but was poor in adsorbing capacity for LDL.

COMPARATIVE EXAMPLE 2

Substantially the same procedures as in Example 1 were repeated to prepare an adsorbent, except that CPG 2000 (a porous glass, having an average pore diameter of 198.4 nm, which is manufactured and sold by Electro Nucleonics, Inc., USA) was used instead of CPG 500 and that the dissolution treatment of the porous glass with 1N aqueous hydroxide was omitted. Thus, there was obtained an adsorbent containing 2.8 mg/ml of the polyacrylic acid bonded thereto. The degree of volume shrinkage of the above-prepared adsorbent was zero at a pressure difference of 200 mm Hg. The pore characteristics of the adsorbent were as follows.

Total pore volume: 0.89 cc/g
Percentage pore volume of 20–1,250 nm pores: 97%
Percentage maximum pore volume of 0.8 D–1.2 D pores: 93%
Specific surface area of the pores having a pore diameter of 25 nm or more: 6.8 m²/ml.

As can be seen from the above data, the specific surface area of the pores having a pore diameter of 25 nm or more was small.

The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 3.

TABLE 3

|  | Plasma before adsorption treatment | Plasma after adsorption treatment | Remaining rate |
|---|---|---|---|
| LDL | 620 mg/dl | 480 mg/dl | 77% |
| HDL-C | 18 mg/dl | 18 mg/dl | 100% |
| Albumin | 3.3 g/dl | 3.2 g/dl | 97% |
| Fibrinogen | 190 mg/dl | 175 mg/dl | 92% |

As can be seen from Table 3, the above-prepared adsorbent exhibited no significant adsorption of HDL-C, albumin and fibrinogen but were poor in adsorbing capacity for LDL.

COMPARATIVE EXAMPLE 3

Substantially the same procedures as in Example 1 were repeated to prepare an adsorbent, except that CPG 350 (a porous glass, having an average pore diameter of 34.5 nm, which is manufactured and sold by Electro Nucleonics, Inc., USA) was used instead of CPG 500 and that the dissolution treatment of the porous glass with 1N aqueous sodium hydroxide was omitted. Thus, there was obtained an adsorbent containing 5.8 mg/ml of the polyacrylic acid bonded thereto. The degree of volume shrinkage of the above-prepared adsorbent was zero at a pressure difference of 200 mmHg. The pore characteristics of the adsorbent were as follows.

Total pore volume: 1.01 cc/g
Percentage pore volume of 20–1,250 nm pores: 97%
Percentage maximum pore volume of 0.8 D–1.2 D pores: 94%
Specific surface area of the pores having a diameter of 25 nm or more: 43 m²/ml As can be seen from the above data, the pore diameter distribution of the above-prepared adsorbent was very sharp.

The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 4.

TABLE 4

|  | Plasma before adsorption treatment | Plasma after adsorption treatment | Remaining rate |
|---|---|---|---|
| LDL | 620 mg/dl | 580 mg/dl | 94% |
| HDL-C | 18 mg/dl | 18 mg/dl | 100% |
| Albumin | 3.3 g/dl | 3.2 g/dl | 97% |
| Fibrinogen | 190 mg/dl | 170 mg/dl | 89% |

As can be seen from Table 4, the above-prepared adsorbent exhibited no significant adsorption of HDL-C, albumin and fibrinogen but was extremely poor in adsorbing capacity for LDL.

EXAMPLE 2

Substantially the same procedures as in Example 1 were repeated to prepare an adsorbent, except that in the dissolution treatment of CPG 500 with an aqueous sodium hydroxide, 60 ml of 0.5N aqueous sodium hydroxide was used instead of 40 ml of 1N aqueous sodium hydroxide and the mixture of CPG 500 and the aqueous sodium hydroxide was allowed to stand for 15 hours instead of being shaken for 12 hours. Thus, there was obtained an adsorbent containing 5.2 mg/ml of the polyacrylic acid bonded thereto. The degree of volume shrinkage of the above-prepared adsorbent was zero at a pressure difference of 200 mmHg. The pore characteristics of the adsorbent were as follows.

Total pore volume: 2.20 cc/g
Percentage pore volume of 20–1,250 nm pores: 92%
Percentage maximum pore volume of 0.8 D–1.2 D pores: 70%
Specific surface area of the pores having a diameter of 25 nm or more: 21 m²/ml The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 5.

TABLE 5

|  | Plasma before adsorption treatment | Plasma after adsorption treatment | Remaining rate |
|---|---|---|---|
| LDL | 620 mg/dl | 200 mg/dl | 32% |
| HDL-C | 18 mg/dl | 18 mg/dl | 100% |
| Albumin | 3.3 g/dl | 3.2 g/dl | 97% |
| Fibrinogen | 190 mg/dl | 180 mg/dl | 95% |

As can be seen from Table 5, the adsorbent of the present invention as prepared above exhibited a highly selective LDL adsorption.

EXAMPLE 3

Substantially the same procedures as in Example 1 were repeated to prepare an adsorbent, except that CPG 240 (a porous glass, having an average pore diameter of 23.7 nm, which is manufactured and sold by Electro Nucleonics, Inc., U.S.A.) was used instead of CPG 500 and that in the dissolution treatment of the porous glass with an aqueous sodium hydroxide, 100 ml of 5N aqueous sodium hydroxide was used instead of 40 ml of 1N aqueous sodium hydroxide and the mixture of the porous glass and the aqueous sodium hydroxide was allowed to stand instead of being shaken. Thus, there was obtained an adsorbent containing 4.7 mg/ml of the polyacrylic acid bonded thereto. The degree of volume shrinkage of the above prepared adsorbent was zero at a pressure difference of 200 mmHg. The pore characteristics of the adsorbent were as follows.

Total pore volume: 3.50 cc/g
Percentage pore volume of 20–1,250 nm pores: 80%
Percentage maximum pore volume of 0.8 D–1.2 D pores: 40%
Specific surface area of the pores having a diameter of 25 nm or more: 22 m²/ml The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 6.

TABLE 6

|  | Plasma before adsorption treatment | Plasma after adsorption treatment | Remaining rate |
|---|---|---|---|
| LDL | 620 mg/dl | 280 mg/dl | 45% |
| HDL-C | 18 mg/dl | 17 mg/dl | 94% |
| Albumin | 3.3 g/dl | 3.2 g/dl | 97% |
| Fibrinogen | 190 mg/dl | 180 mg/dl | 95% |

As can be seen from Table 6, the adsorbent of the present invention as prepared above exhibited a highly selective LDL adsorption.

EXAMPLE 4

Substantially the same procedures as in Example 1 were repeated to prepare an adsorbent, except that CPG 700 (a porous glass, having an average pore diameter of 81 nm, which is manufactured and sold by Electro Nucleonics, Inc., U.S.A.) was used instead of CPG 500 and that in the dissolution treatment of the porous glass with an aqueous sodium hydroxide, 100 ml of 5N aqueous sodium hydroxide was used instead of 40 ml of 1N aqueous sodium hydroxide and the mixture of the porous glass and the aqueous sodium hydroxide was allowed to stand instead of being shaken. Thus, there was obtained an adsorbent containing 4.5 mg/ml of the polyacrylic acid bonded thereto. The degree of volume shrinkage of the above-prepared adsorbent was zero at a pressure difference of 200 mmHg. The pore characteristics of the adsorbent were as follows.

Total pore volume: 3.10 cc/g
Percentage pore volume of 20–1,250 nm pores: 92%
Percentage maximum pore volume of 0.8 D–1.2 D pores: 64%
Specific surface area of the pores having a diameter of 25 nm or more: 15 m²/ml The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 7.

TABLE 7

|  | Plasma before adsorption treatment | Plasma after adsorption treatment | Remaining rate |
|---|---|---|---|
| LDL | 620 mg/dl | 270 mg/dl | 44% |
| HDL-C | 18 mg/dl | 17 mg/dl | 94% |
| Albumin | 3.3 g/dl | 3.1 g/dl | 94% |
| Fibrinogen | 190 mg/dl | 170 mg/dl | 89% |

As can be seen from Table 7, the adsorbent of the present invention as prepared above exhibited a highly selective LDL adsorption.

EXAMPLE 5

An activated porous glass was prepared from a porous glass in substantially the same manner as in Example 1, except that CPG 500 having an average pore diameter of 51.5 nm was used instead of CPG having an average pore diameter of 49.3 nm. The activated porous glass was successively washed with acetone, water and 0.1M sodium carbonate buffer (pH 9.8). To the washed porous glass was added 10 ml of 0.1M sodium carbonate buffer containing 100 mg of polymethacrylic acid (weight average molecular weight: about 12,000) having at its one end an amino group. The resulting mixture was allowed to react, while stirring, at 50° C. for 3 days for fixation of the polymethacrylic acid to the porous glass. After completion of the reaction, the obtained product was thoroughly washed with water to obtain an adsorbent for LDL. Incidentally the above-used polymethacrylic acid having at its one end an amino group was prepared by oligomerization of methacrylic acid using 2-aminoethanethiol as chain transfer agent and α,α'-azobisisobutyronitrile as initiator [M. Okano et al, "Synthesis of 2-hydroxyethyl methacrylate-styrene ABA type block copolymer and structure and wettability of the copolymer," Nippon Kagaku Kaishi, (1), 88–92 (1977)].

Thus, there was obtained an adsorbent containing 3.8 mg/ml of the polymethacrylic acid bonded thereto. The degree of volume shrinkage of the above-prepared adsorbent was zero at a pressure difference of 200 mmHg. The pore characteristics of the adsorbent were as follows.

Total pore volume: 3.90 cc/g
Percentage pore volume of 20–1,250 nm pores: 87%
Percentage maximum pore volume of 0.8D–1.2D pores: 34%
Specific surface area of the pores having a diameter of 25 nm or more: 21 m²/ml The adsorbent had silanol groups which had not been blocked by the γ-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 8.

TABLE 8

|  | Plasma before adsorption treatment | Plasma after adsorption treatment | Remaining rate |
|---|---|---|---|
| LDL | 620 mg/dl | 200 mg/dl | 32% |
| HDL-C | 18 mg/dl | 17 mg/dl | 94% |
| Albumin | 3.3 g/dl | 3.0 g/dl | 91% |
| Fibrinogen | 190 mg/dl | 160 mg/dl | 84% |

As can be seen from Table 8, the adsorbent of the present invention as prepared above exhibited a highly selective LDL adsorption.

EXAMPLE 6

An activated porous glass was prepared from a porous glass in substantially the same manner as in Example 1, except that CPG 500 having an average pore diameter of 51.5 nm was used instead of CPG having an average pore diameter of 49.3 nm. The activated porous glass was successively washed with acetone, water and 0.1M sodium carbonate buffer (pH 9.8). To the washed porous glass was added 10 ml of 0.1M sodium carbonate buffer containing 100 mg of poly(styrenesulfonic acid) (weight average molecular weight: about 20,000) having at its one end an amino group. The resulting mixture was allowed to react, while stirring, at 50° C. for 3 days for fixation of the poly(styrenesulfonic acid) to the porous glass. After completion of the reaction, the obtained product was thoroughly washed with water to obtain an adsorbent for LDL. Incidentally the above-used poly(styrenesulfonic acid) having at its one end an amino group was prepared by oligomerization of styrene sulfonic acid using 2-aminoethanethiol as chain transfer agent and $\alpha,\alpha'$-azobisisobutyronitrile as initiator [M. Okano et al, "Synthesis of 2-hydroxyethyl methacrylatestyrene ABA type block copolymer and structure and wettability of the copolymer," Nippon Kagaku Kaishi, (1), 88-92 (1977)].

Thus, there was obtained an adsorbent containing 2.3 mg/ml of the poly(styrenesulfonic acid) bonded thereto. The degree of volume shrinkage of the above-prepared adsorbent was zero at a pressure difference of 200 mmHg. The pore characteristics of the adsorbent were as follows.

Total pore volume: 3.90 cc/g
Percentage pore volume of 20–1,250 nm pores: 91%
Percentage maximum pore volume of 0.8D–1.2D pores: 37%
Specific surface area of the pores having a diameter of 25 nm or more: 20 m²/ml The adsorbent had silanol groups which had not been blocked by the $\gamma$-glycidoxypropyltrimethoxysilane treatment.

Adsorption test with respect to the above-prepared adsorbent was effected in substantially the same manner as in Example 1, except that the above-prepared adsorbent was used instead of the adsorbent used in Example 1.

The results obtained are shown in Table 9.

TABLE 9

|  | Plasma before adsorption treatment | Plasma after adsorption treatment | Remaining rate |
|---|---|---|---|
| LDL | 620 mg/dl | 280 mg/dl | 45% |

TABLE 9-continued

|  | Plasma before adsorption treatment | Plasma after adsorption treatment | Remaining rate |
|---|---|---|---|
| HDL-C | 18 mg/dl | 16 mg/dl | 89% |
| Albumin | 3.3 g/dl | 2.8 g/dl | 85% |
| Fibrinogen | 190 mg/dl | 150 mg/dl | 79% |

As can be seen from Table 9, the adsorbent of the present invention as prepared above exhibited a highly selective LDL adsorption.

EXAMPLE 7

A homogeneous liquid mixture of 100 g of vinyl acetate, 41.4 g of triallyl isocyanurate, 100 g of ethyl acetate, 7 g of polyvinyl acetate (polymerization degree: 500) and 3.6 g of 2,2'-azobisisobutyronitrile and 400 ml of an aqueous solution containing 1% by weight of polyvinyl alcohol, 0.05% by weight of sodium dihydrogenphosphate dihydrate and 1.5% by weight of disodium hydrogenphosphate dodecahydrate were charged in a flask. The mixture was sufficiently stirred and heated at 65° C. for 18 hours and at 75° C. for 5 hours to effect suspension polymerization. Thus, there was obtained a granular copolymer. The obtained copolymer was washed with water and then acetone. Thereafter, the copolymer was subjected to an ester interchange reaction in a solution of 46.5 g of sodium hydroxide and 2 liters of methanol at 40° C. for 18 hours. Thus, there was obtained a polyvinyl alcohol crosslinked polymer having an average particle diameter of 60 $\mu$m and a hydroxyl group density of 10 meq/g. An adsorbent was prepared using the above-obtained polymer as carrier by the following method. Specifically, 15 g of the above-obtained polymer in dried form was suspended in a solution of 180 ml of dimethyl sulfoxide and 120 ml of epichlorohydrin. To the resulting suspension were added 15 ml of 30% by weight aqueous sodium hydroxide. The resulting mixture was stirred at 30° C. for 5 hours to obtain an epoxy activated carrier.

The fixation of a polyacrylic acid having at its one end an amino group to the above-obtained carrier was effected in substantially the same manner as in Example 1, except that the above-obtained carrier was used instead of the activated porous glass.

Thus, there was obtained an adsorbent containing 7.0 mg/ml of the polyacrylic acid bonded thereto. The degree of volume shrinkage of the above-prepared adsorbent was 2% at a pressure difference of 200 mmHg. The pore characteristics of the adsorbent were as follows.

Total pore volume: 5.40 cc/g
Percentage pore volume of 20–1,250 nm pores: 79%
Percentage maximum pore volume of 0.8D–1.2D pores: 14%
Specific surface area of the pores having a diameter of 25 nm or more: 19 m²/ml The above-mentioned data are ones in the wet state of the adsorbent converted from the data in the dry state.

Adsorption test with respect to the above-prepared adsorbent was effected in substantially the same manner as in Example 1, except that the above-prepared adsorbent was used instead of the adsorbent used in Example 1.

The results obtained are shown in Table 10

TABLE 10

| | Plasma before adsorption treatment | Plasma after adsorption treatment | Remaining rate |
| --- | --- | --- | --- |
| LDL | 620 mg/dl | 120 mg/dl | 19% |
| HDL-C | 18 mg/dl | 18 mg/dl | 100% |
| Albumin | 3.3 g/dl | 3.2 g/dl | 97% |
| Fibrinogen | 190 mg/dl | 180 mg/dl | 95% |

As can be seen from Table 10, the adsorbent of the present invention as prepared above exhibited a highly selective LDL adsorption.

EXAMPLE 8

A homogeneous liquid mixture of 100 g of vinyl acetate, 64.3 g of triallyl isocyanurate, 100 g of ethyl acetate, 7 g of polyvinyl acetate (polymerization degree: 500) and 3.6 g of 2,2'-azobisisobutyronitrile and 400 ml of an aqueous solution containing 1% by weight of polyvinyl alcohol, 0.05% by weight of sodium dihydrogenphosphate dihydrate and 1.5% by weight of disodium hydrogenphosphate dodecahydrate were charged in a flask. The mixture was sufficiently stirred and heated at 65° C. for 18 hours and at 75° C. for 5 hours to effect suspension polymerization. Thus, there was obtained a granular copolymer. The obtained copolymer was washed with water and then acetone. Thereafter, the copolymer was subjected to an ester interchange reaction in a solution of 46.5 g of sodium hydroxide and 2 liters of methanol at 40° C. for 18 hours. Thus, there was obtained a polyvinyl alcohol crosslinked polymer having an average particle diameter of 50 μm and a hydroxyl group density of 8 meq/g bonded thereto. An adsorbent was prepared using the above-obtained polymer as carrier by the following method.

Specifically, 15 g of the above-obtained polymer in dried form was suspended in a solution of 180 ml of dimethyl sulfoxide and 120 ml of epichlorohydrin. To the resulting suspension were added 15 ml of 30% by weight aqueous sodium hydroxide. The resulting mixture was stirred at 30° C. for 5 hours to obtain an epoxy activated carrier.

The fixation of a polyacrylic acid having at its one end an amino group to the above-obtained carrier was effected in substantially the same manner as in Example 1, except that the above-obtained carrier was used instead of the activated porous glass. Thus, there was obtained an adsorbent containing 5.0 mg/ml of the polyacrylic acid bonded thereto. The degree of volume shrinkage of the above-prepared adsorbent was 1% at a pressure difference of 200 mmHg. The pore characteristics of the adsorbent were as follows.

Total pore volume: 4.8 cc/g
Percentage pore volume of 20–1,250 nm pores: 82%
Percentage maximum pore volume of 0.8D–1.2D pores: 18%
Specific surface area of the pores having a diameter of 25 nm or more: 17 m²/ml The above-mentioned data are ones in the wet state of the adsorbent converted from the data in the dry state.

Adsorption test with respect to the above-prepared adsorbent was effected in substantially the same manner as in Example 1, except that the above-prepared adsorbent was used instead of the adsorbent used in Example 1.

The results obtained are shown in Table 11.

TABLE 11

| | Plasma before adsorption treatment | Plasma after adsorption treatment | Remaining rate |
| --- | --- | --- | --- |
| LDL | 620 mg/dl | 150 mg/dl | 24% |
| HDL-C | 18 mg/dl | 17 mg/dl | 94% |
| Albumin | 3.3 g/dl | 3.1 g/dl | 94% |
| Fibrinogen | 190 mg/dl | 180 mg/dl | 95% |

As can be seen from Table 11, the adsorbent of the present invention as prepared above exhibited a highly selective LDL adsorption.

EXAMPLE 9

A homogeneous liquid mixture of 100 g of vinyl acetate, 24.1 g of triallyl isocyanurate, 100 g of ethyl acetate, 7 g of polyvinyl acetate (polymerization degree: 500) and 3.6 g of 2,2'-azobisisobutyronitrile and 400 ml of an aqueous solution containing 1% by weight of polyvinyl alcohol, 0.05% by weight of sodium dihydrogenphosphate dihydrate and 1.5% by weight of disodium hydrogenphosphate dodecahydrate were charged in a flask. The mixture was sufficiently stirred and heated at 65° C. for 18 hours and at 75° C. for 5 hours to effect suspension polymerization Thus, there was obtained a granular copolymer. The obtained copolymer was washed with water and then acetone. Thereafter, the copolymer was subjected to an ester interchange reaction in a solution of 46.5 g of sodium hydroxide and 2 liters of methanol at 40° C. for 18 hours. Thus, there was obtained a polyvinyl alcohol crosslinked polymer having an average particle diameter of 70 μm and a hydroxyl group density of 13 meq/g. An adsorbent was prepared using the above-obtained polymer as carrier by the following method.

Specifically, 15 g of the above-obtained polymer in dried form was suspended in a solution of 180 ml of dimethyl sulfoxide and 120 ml of epichlorohydrin. To the resulting suspension were added 15 ml of 30% by weight aqueous sodium hydroxide. The resulting mixture was stirred at 30° C. for 5 hours to obtain an epoxy activated carrier.

The fixation of a polyacrylic acid having at its one end an amino group to the above-obtained carrier was effected in substantially the same manner as in Example 1, except that the above-obtained carrier was used instead of the activated porous glass.

Thus, there was obtained an adsorbent containing 8.0 mg/ml of the polyacrylic acid. The degree of volume shrinkage of the above-prepared adsorbent was 4% at a pressure difference of 200 mmHg. The pore characteristics of the adsorbent were as follows.

Total pore volume: 5.30 cc/g
Percentage pore volume of 20–1,250 nm pores: 80%
Percentage maximum pore volume of 0.8D–1.2D pores: 15%
Specific surface area of the pores having a diameter of 25 nm or more: 18 m²/ml The above-mentioned data are ones in the wet state of the adsorbent converted from the data in the dry state.

Adsorption test with respect to the above-prepared adsorbent was effected in substantially the same manner as in Example 1, except that the above-prepared adsorbent was used instead of the adsorbent used in Example 1.

The results obtained are shown in Table 12.

TABLE 12

|  | Plasma before adsorption treatment | Plasma after adsorption treatment | Remaining rate |
|---|---|---|---|
| LDL | 620 mg/dl | 160 mg/dl | 26% |
| HDL-C | 18 mg/dl | 18 mg/dl | 100% |
| Albumin | 3.3 g/dl | 3.2 g/dl | 97% |
| Fibrinogen | 190 mg/dl | 180 mg/dl | 95% |

As can be seen from Table 12 the adsorbent of the present invention as prepared above exhibited a highly selective LDL adsorption.

COMPARATIVE EXAMPLE 4

A homogeneous liquid mixture of 100 g of vinyl acetate, 5.1 g of triallyl isocyanurate, 100 g of ethyl acetate, 7 g of polyvinyl acetate (polymerization degree: 500) and 3.6 g of 2,2'-azobisisobutyronitrile and 400 ml of an aqueous solution containing 1% by weight of polyvinyl alcohol, 0.05% by weight of sodium dihydrogenphosphate dihydrate and 1.5% by weight of disodium hydrogenphosphate dodecahydrate were charged in a flask. The mixture was sufficiently stirred and heated at 65° C. for 18 hours and at 75° C. for 5 hours to effect suspension polymerization. Thus, there was obtained a granular copolymer. The obtained copolymer was washed with water and then acetone. Thereafter, the copolymer was subjected to an ester interchange reaction in a solution of 46.5 g of sodium hydroxide and 2 liters of methanol at 40° C. for 18 hours. Thus, there was obtained a polyvinyl alcohol crosslinked polymer having an average particle diameter of 45 μm and a hydroxyl group density of 19 meq/g. An adsorbent was prepared using the above-obtained polymer as carrier by the following method.

Specifically, 15 g of the above-obtained polymer in dried form was suspended in a solution of 180 ml of dimethyl sulfoxide and 120 ml of epichlorohydrin. To the resulting suspension were added 15 ml of 30% by weight aqueous sodium hydroxide. The resulting mixture was stirred at 30° C. for 5 hours to obtain an epoxy activated carrier.

The fixation of a polyacrylic acid having at its one end an amino group to the above-obtained carrier was effected in substantially the same manner as in Example 1, except that the above-obtained carrier was used instead of the activated porous glass.

Thus, there was obtained an adsorbent containing 9.0 mg/ml of the polyacrylic acid. However, the degree of volume shrinkage of the above-prepared adsorbent was as large as 17% at a pressure difference of 200 mmHg, and there was observed a high pressure loss, so that water cannot be passed at a satisfactory high flow rate through a column packed with the adsorbent.

EXAMPLE 10

20 ml of CPG 500 (a porous glass, having an average pore diameter of 51.5 nm, which is manufactured and sold by Electro Nucleonics, Inc., U.S.A.) was put into 40 ml of 1N aqueous sodium hydroxide. The mixture was shaken at room temperature for 12 hours to effect the dissolution treatment of the porous glass for the adjustment of pore diameter distribution of the pore glass. The above-treated porous glass was thoroughly washed with water and dried.

The above-treated porous glass had the following pore characteristics and was used as adsorbent for LDL.

Total pore volume: 3.91 cc/g
Percentage pore volume of 20-1,250 nm pores: 92%
Percentage maximum pore volume of 0.8D-1.2D pores: 26%
Specific surface area of the pores having a diameter of 25 nm or more: 21 m²/ml Adsorption test with respect to the adsorbent was effected as follows. 12 ml of plasma of a patient suffering from heparin-added cholesteremia was mixed with 1 ml of the adsorbent and incubated, while shaking, at 37° C. for 3 hours. The resulting suspernatant was subjected to determination with respect to LDL. The results obtained were as follows.

LDL in plasma before adsorption treatment: 620 mg/dl
LDL in plasma after adsorption treatment: 120 mg/dl As can be seen from the test results, the adsorption of LDL to the adsorbent was as large as 60 mg per ml of the adsorbent.

COMPARATIVE EXAMPLE 5

CPG 500 was used as adsorbent for LDL.
CPG 500 had the following pore characteristics.
Total pore volume: 1.02 cc/g
Percentage pore volume of 20-1,250 nm pores: 98%
Percentage maximum pore volume of 0.8D-1.2D pores: 93%
Specific surface area of the pores having a diameter of 25 nm or more: 32 m²/ml As can be understood from the above-given data, the pore diameter distribution of the adsorbent was very sharp.

Adsorption test with respect to CPG 500 was effected in substantially the same manner as in Example 10, except that CPG 500 was used instead of the adsorbent used in Example 10. The results obtained were as follows.

LDL in plasma before adsorption treatment: 620 mg/dl
LDL in plasma after adsorption treatment: 430 mg/dl As can be seen from the test results, the adsorption of LDL to CPG 500 was as small as 23 mg per ml of CPG 500.

In Examples as described above, the weight average molecular weights of polyanion compounds were determined by the gel permeation chromatography under the following conditions.

| | |
|---|---|
| Column: | G6000 PW + G5000PW + G3000PW (each manufactured by Toyo Soda Kogyo K.K.) |
| Column Size: | 7.5 mm(inner diameter) × 60 cm(length) |
| Mobile Phase: | 0.1 M phasphate buffer + 0.3 M NaCl (PH 7.0) |
| Flow Rate: | 1.0 ml/min |
| Temperature: | 25° C. |
| Detector: | RI |
| Standard Material: | polyethylene glycol[molecular weight: 62(ethylene glycol)-20,000] dextran[molecular weight: 20,000-30,000,000] |

What is claimed is:

1. A porous adsorbent for adsorbing thereonto a low density lipoprotein:

which comprises a carrier surface and, linked with the surface, at least one member selected from a silanol group and a synthetic polyanion member having a chain structure and a molecular weight of 600 or more, said synthetic polyanion member having at least one functional group selected from the group consisting of a carboxyl group, sulfonic group and phosphoric acid group, said adsorbent satisfying at least one requirement selected from the group consisting of such requirement that the silanol group is present on the surface at a density of 0.8 to 7.5 $\mu$mol/m$^2$ and such requirement that the amount of the negative charge of the synthetic polyanion member relative to that of the adsorbent is $1\times10^{-6}$ to $1\times10^{-3}$ equivalent per ml of the adsorbent; and which has pores, the pore diameters of pores occupying 70% or more of pore volume based on the total pore volume of the adsorbent being distributed in the range of 20 nm to 1,250 nm, the pore volume of pores of a pore diameter in the range of 0.8 D to 1.2 D in which D represents the pore diameter of any one of pores having pore diameters in the range of 20 nm to 1,250 nm being less than 80% based on the total pore volume of the adsorbent.

2. An adsorbent according to claim 1, wherein said synthetic polyanion member has at least one negative charge-producing functional group per 300 in molecular weight of the synthetic polyanion member.

3. An adsorbent according to claim 1, wherein said synthetic polyanion member is a synthetic polycarboxylic acid.

4. An adsorbent according to claim 1, wherein said synthetic polyanion member is at least one member selected from the group consisting of a synthetic polyacrylic acid and a derivative thereof.

5. An adsorbent according to claim 1, which has a degree of volume shrinkage of 15% or less at a pressure difference of 200 mmHg.

6. An adsorbent according to claim 1, which has a degree of volume shrinkage of 10% or less at a pressure difference of 200 mmHg.

7. An adsorbent according to claim 1, which has a degree of volume shrinkage of 5% or less at a pressure difference of 200 mmHg.

8. An adsorbent according to claim 1, which has a degree of volume shrinkage of 3% or less at a pressure difference of 200 mmHg.

9. An adsorbent according to claim 1, wherein the surface area of the pores having a diameter of 25 nm or more is 10 m$^2$ or more per ml of the adsorbent.

10. An adsorbent according to claim 1, wherein said adsorbent comprises a member selected from the group consisting of quartz, silica glass and silica gel having a silanol group on the surface thereof.

11. A porous adsorbent for adsorbing thereonto a low density lipoprotein which comprises a carrier comprised of a member selected from the group consisting of quartz, silica glass and silica gel having a silanol group on the surface thereof, the surface of said carrier further including linked thereto a synthetic polyanion member having a chain structure and a molecular weight of 600 or more, said synthetic polyanion member having at least one functional group selected from the group consisting of a carboxyl group, sulfonic group and phosphoric acid group, and said adsorbent having pores, the pore diameters of pores occupying 70% or more of pole volume based on the total pore volume of the adsorbent being distributed in the range of 20 nm to 1,250 nm, the pore volume of pores of a pore diameter in the range of 0.8 D to 1.2 D in which D represents the pore diameter of any one of pores having pore diameters in the range of 20 nm to 1,250 nm being less than 80% based on the total pore volume of the adsorbent.

12. An adsorbent according to claim 11, wherein said adsorbent satisfies at least one requirement selected from the group consisting of such requirement that the silanol group is present on the surface at a density of 0.8 to 7.5 $\mu$mol/m$^2$ and such requirement that the amount of the negative charge of the synthetic polyanion member relative to that of the adsorbent is $1\times10^{-6}$ to $1\times10^{-3}$ equivalent per ml of the adsorbent.

13. An adsorbent according to claim 11, wherein said synthetic polyanion member is a synthetic polycarboxylic acid.

14. An adsorbent according to claim 11, wherein said synthetic polyanion member is at least one member selected from the group consisting of a synthetic polyacrylic acid and a derivative thereof.

15. An adsorbent according to claim 1, which has a degree of volume shrinkage of 15% or less at a pressure difference of 200 mmHg.

* * * * *